(12) United States Patent
Binette et al.

(10) Patent No.: US 9,199,128 B2
(45) Date of Patent: Dec. 1, 2015

(54) NON-IONOMERIC POLYMER COMPOSITIONS FOR GOLF BALL CONSTRUCTIONS AND METHODS RELATING THERETO

(71) Applicant: Acushnet Company, Fairhaven, MA (US)

(72) Inventors: Mark L. Binette, Mattapoisett, MA (US); Robert Blink, Newport, RI (US); David A. Bulpett, Boston, MA (US); Rick Kuhner, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 208 days.

(21) Appl. No.: 14/069,429

(22) Filed: Nov. 1, 2013

(65) Prior Publication Data

US 2015/0005100 A1 Jan. 1, 2015

Related U.S. Application Data

(63) Continuation-in-part of application No. 13/929,841, filed on Jun. 28, 2013.

(51) Int. Cl.
| | |
|---|---|
| *C08K 5/09* | (2006.01) |
| *A63B 37/00* | (2006.01) |
| *C08K 5/098* | (2006.01) |
| *A63B 45/00* | (2006.01) |

(52) U.S. Cl.
CPC ......... *A63B 37/0024* (2013.01); *A63B 37/0051* (2013.01); *A63B 37/0075* (2013.01); *A63B 37/0076* (2013.01); *A63B 45/00* (2013.01); *C08K 5/09* (2013.01); *C08K 5/098* (2013.01);

(58) Field of Classification Search
None
See application file for complete search history.

(56) References Cited

U.S. PATENT DOCUMENTS

| | | | | |
|---|---|---|---|---|
| 5,705,565 | A * | 1/1998 | Hughes et al. | 525/65 |
| 6,624,221 | B2 * | 9/2003 | Takesue et al. | 524/277 |
| 7,465,769 | B2 | 12/2008 | Esseghir et al. | |
| 7,612,135 | B2 | 11/2009 | Kennedy, III et al. | |
| 7,939,607 | B2 | 5/2011 | Allermann et al. | |
| 2006/0281843 | A1 * | 12/2006 | Rajagopalan | 524/322 |
| 2010/0167845 | A1 * | 7/2010 | Kim et al. | 473/376 |
| 2010/0227709 | A1 * | 9/2010 | Sullivan et al. | 473/374 |

FOREIGN PATENT DOCUMENTS

JP 60023449 * 2/1985

* cited by examiner

*Primary Examiner* — David Buttner
(74) *Attorney, Agent, or Firm* — Margaret C. Barker

(57) ABSTRACT

The invention is directed to a method of making a neutralized non-ionomeric polymer composition (NNIPC) suitable for use in a golf ball component comprising the steps of: providing a non-acid copolymer composition (NACC); soaking the NACC in an organic acid to form a soaked non-acid copolymer composition (SNACC); providing a cation source in an amount sufficient to neutralize at least a portion of the organic acid; and melt processing the SNACC and cation source to form the NNIPC. The invention also relates to a method of making a golf ball incorporating the NNIPC made according to the inventive method and to the resulting golf ball.

14 Claims, No Drawings

NON-IONOMERIC POLYMER COMPOSITIONS FOR GOLF BALL CONSTRUCTIONS AND METHODS RELATING THERETO

CROSS-REFERENCE TO RELATED APPLICATIONS

This application is a continuation-in-part of co-pending U.S. patent application Ser. No. 13/929,841, filed on Jun. 28, 2013, the entire disclosure of which is hereby incorporated herein in its entirety.

FIELD OF THE INVENTION

This invention relates generally to methods for manufacturing neutralized polymers suitable for golf ball constructions as well as to methods for making golf balls incorporating neutralized polymers and to golf balls incorporating such neutralized polymers. The invention also relates to methods for making non-ionomeric polymer compositions suitable for golf ball constructions as well as to methods for manufacturing golf balls incorporating such compositions and to the resulting golf balls.

BACKGROUND OF THE INVENTION

Golf balls, whether of solid or wound construction, generally include a core and at least a cover and/or outer coating. The core may be solid or liquid-filled, and may comprise one piece or have a center with one or more outer core layers formed about the center. Covers may also be formed of one or more layers. Multi-layer cores and covers are sometimes known as "dual core" and "dual cover" golf balls, respectively.

The playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction or may be formed of a tensioned elastomeric winding, which are referred to as wound balls. The difference in play characteristics resulting from these different types of constructions can be quite significant.

Cores are generally made using techniques such as compression or injection molding. Typically, the center is formed by compression molding a slug of uncured core material into a spherical structure. The outer core layers may be formed, for example, by molding compositions over the center by compression or injection molding techniques. In turn, the intermediate and/or cover layers are applied.

A cover layer(s) may be formed over the outermost of the core or intermediate layer (collectively referred to herein as "ball subassembly") using suitable techniques including, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. In a compression molding process, hemispherical shells are generally placed about the subassembly in a compression mold and fused together under sufficient heat and pressure. In contrast, with an injection molding process, cover material is injected about and directly onto the subassembly using retractable pins, for example.

When a cover layer is formed by a casting process, liquid cover material is poured into lower and upper mold cavities, into which a subassembly is lowered at a controlled speed. The subassembly is held in place via partial vacuum to the point of sufficient gelling, and then the upper mold cavity is mated with the lower mold cavity under sufficient pressure and heat followed by cooling the unit until it can be handled without deformation.

Golf ball core and cover layers are typically constructed with polymer compositions such as polybutadiene rubber, polyurethanes, polyamides, ionomers, and blends thereof. Ionomers, particularly ethylene-based ionomers, are a desirable group of polymers for golf ball layers because of their toughness, durability, and wide range of hardness values. Further, golf balls incorporating fatty acid neutralized acid polymers are generally known for achieving desirable golf ball properties relating for example to spin, feel, and CoR.

In this regard, fatty acid neutralized acid polymers may be manufactured by feeding acid copolymers and organic acids into a melt extruder such as a single or twin screw extruder via separate feed lines, and adding a suitable amount of cation source for neutralizing a desired level of acid groups present. The ingredients may be intensively mixed prior to being extruded as a strand from the die-head.

Several drawbacks have presented from feeding each ingredient into the extruder individually. First, formulation errors occur because coordinating the varied feed rates of multiple feed lines can be difficult. Additionally, the organic acid sometimes fails to distribute uniformly throughout the mixture within the extruder in relation to the acid copolymer, thereby producing a resulting material lacking homogeneity in localized areas—a quality control issue which increases the overall cost of golf ball manufacture. Accordingly, there remains a need for improved methods for manufacturing neutralized polymers suitable for golf ball constructions as well as to methods for making golf balls incorporating neutralized polymers and to golf balls incorporating such neutralized polymers which reduce the margin for formulation error and lower manufacturing costs.

And concerning non-ionomeric polymer compositions, there is an added difficulty—namely that non-ionomeric polymer compositions generally have undesirably lower resilience and durability than ionomeric compositions. Thus, there is also a need for methods and golf balls incorporating improved non-ionomeric polymer compositions that possess better resiliency and durability than conventional non-ionomeric polymer compositions and which meanwhile also obviate the above-described problems encountered when the ingredients for forming a non-ionomeric polymer composition are added into the mixture simultaneously. The present invention addresses and solves these needs.

SUMMARY OF THE INVENTION

The present invention is directed to a method of making a neutralized polymer composition ("NPC") suitable for use in a golf ball component (core, whether a single solid core or a multi-layer core having a center and at least one outer core layer, cover, or any intermediate layer) comprising the steps of: providing an acid copolymer composition comprising one or more ethylene-acid copolymers; soaking the acid copolymer composition in one or more organic acids wherein substantially all of the organic acid is absorbed within the acid copolymer composition to form a soaked polymeric composition ("SPC"); optionally providing one or more cation sources in an amount sufficient to neutralize at least a portion of the acid copolymer(s) and organic acid(s) to a target level; and melt processing the soaked polymeric composition and cation source(s) to form an NPC.

Herein, an NPC may be any of the following: a "highly neutralized polymer composition"—that is, greater than 80% of acid groups present are neutralized; a "very neutralized polymer composition"—70%-80% of acid groups present are neutralized; or a "partially neutralized polymer composition"—wherein less than 70% of acid groups present are neutralized. And the "target level" of percent acid groups present in the soaked polymeric composition being neutralized with the cation source will fall within one of these neutralization ranges.

For example, in one embodiment, the NPC is a highly neutralized polymer composition wherein the target level of acid groups present being neutralized with the cation source is greater than about 100%. In another embodiment, the NPC is a highly neutralized polymer composition wherein the target level of acid groups present being neutralized with the cation source is greater than about 95%. In yet another embodiment, the NPC is a highly neutralized polymer composition wherein the target level of acid groups present being neutralized with the cation source is greater than about 90%. In still another embodiment, the NPC is a highly neutralized polymer composition wherein the target level of acid groups present being neutralized with the cation source is greater than 80% to about 90%. In an alternative embodiment, the NPC is a highly neutralized polymer composition wherein the target level of acid groups present being neutralized with the cation source is from 85% to 95%. In a different embodiment, the NPC is a highly neutralized polymer composition wherein the target level of acid groups present being neutralized with the cation source is 81%, or 84%, or 87% or 91%, or 93%, or 97%, or about 83%, or about 86%, or about 92%, or about 94%, or about 96%, or about 98% or 99% or about 100%, or about 105%, or about 125%, or about 150%, or about 173%, or about 200%.

Additionally, in one embodiment, the NPC is a very neutralized polymer composition wherein the target level of acid groups present being neutralized with the cation source is greater than 70% but less than 80%. In another embodiment, the NPC is a very neutralized polymer composition wherein the target level of acid groups present being neutralized with the cation source is greater than about 75% and up to 80%. In yet another embodiment, the NPC is a very neutralized polymer composition wherein the target level of acid groups present being neutralized with the cation source is greater than 70% and up to 78%. In still another embodiment, the NPC is a very neutralized polymer composition wherein the target level of acid groups present being neutralized with the cation source is greater than 73% and less than 78%. In an alternative embodiment, the NPC is a very neutralized polymer composition wherein the target level of acid groups present being neutralized with the cation source is from about 75% to about 77%. In a different embodiment, the NPC is a very neutralized polymer composition wherein the target level of acid groups present being neutralized with the cation source is 70%, or 71%, or 74%, or 77% or 79%, or 80%, or about 73%, or about 76%, or about 79%.

Meanwhile, in one embodiment, the NPC is a partially neutralized polymer composition wherein the target level of acid groups present being neutralized with the cation source is less than 70%. In another embodiment, the NPC is a partially neutralized polymer composition wherein the target level of acid groups present being neutralized with the cation source is greater than about 45% and up to 70%. In yet another embodiment, the NPC is a partially neutralized polymer composition wherein the target level of acid groups present being neutralized with the cation source is 55% and up to 70%. In still another embodiment, the NPC is a partially neutralized polymer composition wherein the target level of acid groups present being neutralized with the cation source is greater than 63% and less than 70%. In an alternative embodiment, the NPC is a partially neutralized polymer composition wherein the target level of acid groups present being neutralized with the cation source is from about 35% to about 57%. In a different embodiment, the NPC is a partially neutralized polymer composition wherein the target level of acid groups present being neutralized with the cation source is 10%, or 21%, or 34%, or 47%, or 59%, or 65%, or about 13%, or about 16%, or about 29%, or about 36%, or about 42%, or about 53%, or about 57%, or about 64%, or 69%.

Herein, the terms "melt processing" or "melt processed" shall refer to melt blending two or more ingredients of the inventive composition in polymer processing equipment at an elevated temperature with a sufficient amount of shear mixing for a period long enough to the attain the desired properties of the end product. Melt processing may be accomplished by numerous conventional melt blending procedures. In this regard, the soaked polymeric composition along with a required amount of cation source(s) necessary to achieve the desired level of neutralization can be melt processed in a twin-rotor type internal mixer, two-roll mills, or extruded in a single or twin-screw extruder. The melt-processed material is usually formed into slabs, preforms, or pellets at or just after melt processing, which can used immediately or stored easily for molding or blending at a later time.

The above-identified steps of providing an acid copolymer composition and soaking the acid copolymer composition in an organic acid to form a soaked polymeric composition may advantageously be performed well in advance of or just prior to the steps of providing the cation source and melt processing the soaked polymeric composition and cation source. For example, in one embodiment, the soaked polymeric composition may be pre-formed, packaged and transported to the manufacturing plant where the soaked polymeric composition is then added into the extruder and the remaining aforementioned steps of the method of making the NPC are performed.

The acid copolymer composition may comprise a powder, particulates, pellets or any other solid form capable of or suitable for absorbing, incorporating and/or otherwise containing the organic acid as a result of the soaking step. An acid copolymer composition may also include at least one non-acid polymer. The acid copolymer may be a single acid copolymer or a mixture of two or more acid copolymers.

Additionally, the organic acid may comprise a single organic acid or a blend of at least two different organic acids. However, the organic acid(s) and acid copolymer(s) should be chosen such that the former is a liquid and the latter is a solid and is not blocked at the temperature at which the soaking step is performed. Herein, the term "blocked" refers, for example, to significant adhesion between two polymer surfaces. For example, acid copolymer composition pellets are generally blocked where the pellets adhere to each other inseparably.

In one embodiment, the soaking step may be performed at a temperature of about 20° C. or greater. In another embodiment, the soaking step may be performed at a temperature of from about 25° C. to about 125° C. In yet another embodiment, the soaking step is performed at a temperature of from about 40° C. to about 100° C. or greater. In still another embodiment, the soaking step is performed at a temperature of from about 40° C. to about 60° C. In an alternative embodiment, the soaking step is performed at a temperature of about 60° C. or greater. In a different embodiment, the soaking step is performed at a temperature of about 70° C. or greater. The soaking step may also be performed at a temperature of about 70° C. or greater or from about 80° C. to about 120° C. or from about 80° C. to about 110° C. In some embodiments, the soaking step may require a multiplicity or series of temperatures and durations.

For example, in one embodiment, the organic acid is lauric acid, which has a melting temperature of 44° C., and the acid copolymer is an ethylene-acid copolymer. The lauric acid is provided and maintained at a soaking temperature that is equal to or greater than 44° C. but less than a temperature at which the ethylene-acid copolymer blocks. Subsequently, the ethylene acid copolymer is added into the liquid lauric acid and the soaking step is performed until substantially all of the organic acid is absorbed within the ethylene-acid copolymer. Where the chosen organic acid/organic acid blend is a liquid and the acid-copolymer composition a solid at room temperature, then the soaking step may optionally be performed at room temperature. Further, if a first chosen organic acid is not a liquid at room temperature, the soaking step may nevertheless be performed at room temperature by dissolving the first organic acid in a suitable second organic acid that is indeed a liquid below room temperature. Once again, the soaking temperature may be any temperature at which the organic acid or mixture of organic acids is a liquid and the acid copolymer composition is not blocked. However, generally, soaking at comparatively higher temperatures within the permissible range will allow for incorporation of higher levels of organic acids, shorter soak duration, or both.

In one embodiment, the soaked polymer composition (or SPC) comprises a plurality of acid copolymer solids that have substantially absorbed a predetermined amount of liquid organic acid. In this embodiment of the soaking step, a predetermined weight % of acid copolymer composition substantially absorbs a predetermined weight % of the organic acid and the resulting soaked polymeric composition comprises a discrete weight ratio of organic acid to acid copolymer composition.

Non-limiting examples of the weight ratio of organic acid to acid copolymer composition are as follows. In one embodiment, the weight ratio is from about 1:9 to about 1:1. In another embodiment, the weight ratio is from about 1:3 to about 3:5. In yet another embodiment, the weight ratio is from about 1:5 to about 3.25:5.

More particularly, the weight ratio of organic acid to acid copolymer composition may have a lower limit of about 1:9 or about 1:5 or about 1:4 or about 1:3 or about 1:2 and an upper limit of about 1:2 or about 2:3 or about 1:1 or about 3:2 or about 2:1.

Additionally, in one embodiment, the weight ratio of organic acid to acid copolymer composition is about 2:3. In another embodiment, the weight ratio of organic acid to acid copolymer composition is about 1:5. In yet another embodiment, the weight ratio of organic acid to acid copolymer composition is about 1:1. In still another embodiment, the weight ratio of organic acid to acid copolymer composition is about 1:9. In a different embodiment, the weight ratio of organic acid to acid copolymer composition is about 2:9. In another embodiment, the ratio of organic acid to acid copolymer composition is about 3:2.

One advantage of the method of the invention for making an NPC is that a more uniformly distributed and homogenous mixture results within the extruder because the organic acid and the acid copolymer composition comprise a unit when added into the extruder as opposed to being separately fed into the extruder. Thus, one benefit is reduced incidence of localized areas of heterogeneity in the resulting material.

Moreover, the risk of formulation error is lower when the ethylene acid copolymer and organic acid are added as a unit into the extruder rather than being fed into it individually because as a unit, the weight ratio of the ingredients are fixed before addition to the extruder.

The present invention is also directed to a method of making a golf ball comprising the steps of: providing a core or center; forming at least one layer about the core or center (e.g. intermediate layer or outer core layer); and forming a cover about the layer; wherein at least one of the core or center, a layer and the cover comprises an NPC formed by providing an acid copolymer composition; soaking the acid copolymer composition in an organic acid(s), or organic acid blend or derivatives thereof to form a soaked polymeric composition; providing a cation source in an amount sufficient to neutralize a target level of acid groups present; and melt processing the soaked polymeric composition and cation source.

The invention is further directed to a golf ball comprising: a core and a cover disposed about the core; wherein at least one of the core and the cover comprises an NPC formed from a soaked polymeric composition comprising an acid copolymer soaked in an organic acid, wherein substantially all of the organic acid is absorbed within the acid copolymer; and wherein a target level of acid groups present in the soaked polymeric composition are neutralized with a cation source.

Embodiments are envisioned wherein a golf ball component may be formed in part from an NPC made according to the method of the invention as detailed herein and also formed in part from a neutralized polymer made by a conventional method of separately feeding organic acid and acid copolymer into the extruder. Performing both methods may be particularly advantageous, for example, where a first chosen organic acid is soakable within the chosen acid copolymer while a second chosen organic acid is not (it cannot be substantially absorbed with the chosen acid copolymer).

Additionally, embodiments are envisioned wherein the golf ball component comprises a material formed by melt processing a mixture of soaked and non-soaked polymeric ingredients. For example, in one non-limiting embodiment, a first portion of the polymeric ingredients (ethylene-acid copolymer(s) or non-acid copolymer (the polymer)) is soaked, while a second portion of the polymeric ingredient(s) is not soaked, and the soaked and unsoaked portions are melt blended together in an extruder. Among other reasons, this method may allow for increasing the temperature of the soak in the case of soaking a high melting polymeric ingredient.

In a different non-limiting embodiment, the invention is directed to a golf ball comprising: a core or center, at least one layer surrounding the core or center and a cover disposed about the layer; wherein at least one of a core or center, the layer and the cover comprises a neutralized polymeric composition (NPC) formed from a soaked polymeric composition comprising an acid copolymer composition soaked in an organic acid wherein substantially all of the organic acid is absorbed within the acid copolymer composition; and wherein the soaked polymeric composition is melt processed with a cation source that is provided in an amount sufficient to neutralize at least a portion the acid copolymer composition and organic acid.

Embodiments are also envisioned wherein sufficient cation source(s) is added to neutralize up to about 100% or 120% or 150% or 175% or 200% or more of acid groups present. In another embodiment additional organic acid is added sufficient to reduce the degree of neutralization to less than 70% or 70-80% or greater than 80% or 70-90% or 90-100% without adding more cation source.

In some embodiments, a soaking step at elevated temperature may further comprise incorporating an antioxidant package to prevent or inhibit oxidation of the organic acid or its derivatives and polymer. In this regard, the antioxidant may for example be a liquid and/or dissolved in and thoroughly mixed with the organic acid prior to soaking the polymer. Suitable antioxidants include but are not limited to phenols, hindered phenols, phosphites, propionates, triazines and thioethers. Suitable antioxidants include but are not limited to those disclosed herein below. These and other antioxidants can be used alone or in combination. If used in combination, antioxidants can be added during the soaking step and/or during melt blending.

For example, suitable antioxidants include: butylated hydroxy anisole (BHA); butylated hydroxy toluene (BHT); tris(nonylphenyl)phosphite (TNPP); diisooctylphosphite (DOPI); diisodecyl pentaerythritol diphosphite; Irganox® 1010—tetrakis[methylene(3,5-di-tert-butyl-4-hydroxyhydrocinnamate)]methane; Irganox® 1076—octadecyl 3,5-di-tert-butyl-4-hydroxyhydrocinnamate; Irganox®1035—thiodiethylene bis(3,5-di-tert-butyl-4-hydroxyhydrocinnamate); Irganox® 245—ethylenebis(oxyethylene)bis-(3-tert-butyl-4-hydroxy-5-methylhydrocinnamate); Irganox® 1520—2-methyl-4,6-bis[(octylthio)methyl]phenol; Irganox®MD 1024—1,2-bis(3,5-di-tert-butyl-4-hydroxyhydrocinnamoyl)hydrazine; Irganox® PS802—distearyl thiodipropionate; Irganox® PS800—dilauryl thiodipropionate and Irganox® 3125—3,5-di-tert-butyl-4-hydroxyhydrocinnamic acid triester with 1,3,5-tris(2-hydroxyethyl)-S-triazine-2,4,6 (1H,3H,5H)-trione. Irganox® is available from BASF.

Oxidation may also be reduced using other methods, for example, via an airtight container or other unit incorporating an inert gas blanket such as Nitrogen or Argon.

In another embodiment, the acid copolymer composition is formed by melt processing together at least one acid copolymer and at least one polymer prior to soaking the composition in the organic acid. In a further embodiment, the acid copolymer and polymer are selected such that: (1) one ingredient has a substantially higher melting temperature than the other; and/or (2) one ingredient uptakes the organic acid much better than the other (i.e. one ingredient generally can hold higher levels of the organic acid than the other ingredient). Instance (1) enables soaking of the acid copolymer composition at a higher temperature, thereby increasing the speed and amount of weight uptake of the organic acid and reducing the likelihood of blocking since the low melt polymer does not exist as a discrete pellet. Meanwhile, instance (2) provides for easier material handling and reduces the likelihood of surging within in the extruder, since the high weight uptake ingredient does not have to carry more than its share of organic acid.

In this regard, an NPC suitable for use in a golf ball component may be made by a method comprising the steps of: providing an acid copolymer composition and an organic acid; wherein the acid copolymer composition is formed by melt-processing at least one acid copolymer and at least one polymer, the acid copolymer having a substantially higher melting temperature than the melting temperature of the polymer, or vice versa; and wherein the organic acid has a melting temperature that is less than the melting temperature of the acid copolymer composition; soaking the melt-processed acid copolymer composition in an organic acid at a soaking temperature that is less than the melting temperature of the acid copolymer composition to form a soaked polymeric composition; providing a cation source(s) in an amount sufficient to neutralize at least a portion of the acid copolymer composition and organic acid; and melt processing the soaked polymeric composition and cation source(s) to form the NPC.

In turn, a golf ball having at least one component comprising an NPC may be made via a method comprising the steps of: providing a core or center; forming a layer about the center; and forming a cover about the layer; wherein at least one of the core or center, the layer and the cover comprises an NPC formed by: providing an acid copolymer composition formed by melt-processing at least one acid copolymer and at least one polymer; soaking the acid copolymer composition in an organic acid having a melting temperature that is less than the melting temperature of the acid copolymer composition to form a soaked polymeric composition; providing a cation source in an amount sufficient to neutralize at least a portion of the ethylene-acid copolymer composition and organic acid; and melt processing the soaked polymeric composition and cation source.

In one embodiment, the acid copolymer has a substantially higher melting temperature than the melting temperature of the polymer. In another embodiment, the polymer has a substantially higher melting temperature than the melting temperature of acid copolymer.

A resulting golf ball of the invention may comprise, for example, a core or center and a cover disposed about the core or center; wherein at least one of the core or center and the cover comprises a neutralized polymer composition (NPC) formed from a soaked polymeric composition comprising an acid copolymer composition soaked in an organic acid; the acid copolymer composition being formed by melt-processing at least one acid copolymer and at least one polymer; and wherein a target level of acid groups present in the soaked polymeric composition are neutralized. The NPC may be incorporated in any or all of a golf ball core or center, intermediate layer, cover and/or a coating, depending on golf ball structure and desired properties.

In a different embodiment, a golf ball of the invention comprises a core having one or more layers and a cover disposed about the core; wherein at least one of the core and the cover comprises a neutralized polymer composition (NPC) formed from a soaked polymeric composition comprising an acid copolymer composition soaked in an organic acid; the acid copolymer composition being formed by melt-processing at least one acid copolymer and at least one polymer, wherein the acid copolymer and the polymer have substantially different melting temperatures; wherein substantially all of the organic acid is absorbed within the acid copolymer composition; and wherein a target level of acid groups present in the soaked polymeric composition are neutralized.

In another embodiment, a golf ball of the invention comprises a core having one or more layers and a cover disposed about the core; wherein at least one of the core and the cover comprises a neutralized polymer composition (NPC) formed from a soaked polymeric composition comprising an acid copolymer composition soaked in an organic acid; wherein substantially all of the organic acid is absorbed within the acid copolymer composition; and wherein a target level of acid groups present in the soaked polymeric composition are neutralized such that the golf ball has a CoR greater than 0.8 at 125% neutralization.

In yet another embodiment, the acid copolymer composition is formed from (a) a high acid ethylene/acrylic acid copolymer and (b) ethylene/acrylic acid/methyl acrylate copolymer; wherein the organic acid is comprised of oleic acid; and wherein the cation source is comprised of magnesium hydroxide in an amount sufficient to neutralize from about 95% to about 125% of the acid copolymer composition and organic acid.

The term "high acid", in connection with ethylene-acid copolymers shall refer to an acid content of about 17% acid by weight or greater. In one embodiment, the ethylene-acid copolymer is about 19% acid by weight or greater, or about 20% acid by weight or greater, or about 20.5% acid by weight or greater, or about 22% acid by weight or greater, or about 24% acid by weight or greater, or about 27% acid by weight or greater.

Moreover, it is understood that an SPC, as described herein, may also comprise polymers which are not ultimately neutralized but are capable of substantially absorbing an organic acid and/or its derivatives. For example, in one non-limiting example, a golf ball of the invention may comprise a core or center and a cover disposed about the core or center, wherein at least one of the core or center and the cover is formed from a soaked polymeric composition comprising an ethylene-acid copolymer and a polyolefin, soaked in a fatty acid ester wherein substantially all of the fatty acid ester is absorbed within the polyolefin. In another non-limiting example, fatty acid amides are absorbed within the polyolefin.

In one embodiment, the invention is directed to a multi-piece golf ball consisting of a center, a thermoplastic intermediate core layer, a thermoplastic outer core layer, an inner cover layer and an outer cover layer. The center is formed from a rubber composition and has a diameter of from 0.750 inches to 1.500 inches and has a geometric center hardness of 30 Shore C or greater. The intermediate core layer is formed from a neutralized polymeric composition (NPC) formed from a soaked polymeric composition and having a first flex modulus and a surface hardness of 30 to 85 Shore C. The outermost core layer is formed from a second NPC and has a flex modulus greater than the flex modulus of the intermediate core layer and has a surface hardness of 35 to 90 Shore C. The inner cover layer is comprised of a thermoplastic composition and has a surface hardness greater than 65 Shore D. Some examples of suitable materials for the inner cover layer include ionomers, polyurethanes, polyamides, polyether block amides, polyester based thermoplastic elastomers and blends thereof. The surface hardness of the outer cover layer is less the inner cover layer, and is formed from a composition selected from the group consisting of polyurethanes, polyureas, ionomers, and copolymers and blends thereof.

In an additional embodiment, the present invention is directed to a golf ball comprising a core and a cover. The core consists of a center and an outer core layer. The center comprises a neutralized polymeric composition (NPC) formed from a soaked polymeric composition, and has a diameter of 0.625 to 1.375 inches and has a surface hardness of 30 to 85 Shore C. The outer core layer is formed from a rubber composition, and a thickness of 0.100 to 0.450 inches. The surface hardness of the outer core layer is in the range of 35 to 95 Shore C, and has a surface hardness greater than the surface hardness of the center. The cover consists of an outer cover layer and an inner cover layer, and the surface hardness of the inner cover layer is greater than the surface hardness of the outer cover layer. The inner cover layer is comprised of a thermoplastic composition and has a surface hardness greater than 65 Shore D. Some examples of suitable materials for the inner cover layer include ionomers, polyurethanes, polyamides, polyether block amides, polyester based thermoplastic elastomers and blends thereof. The outer cover layer is formed from a composition selected from the group consisting of polyurethanes, polyureas, ionomers, and copolymers and blends thereof.

In addition, golf balls of the invention may incorporate via a method of the invention non-ionomeric polymeric compositions having better resiliency and durability than conventional non-ionomeric materials. Accordingly, the invention is directed to a method of making a neutralized non-ionomeric polymer composition (NNIPC) suitable for use in a golf ball component comprising the steps of: providing a non-acid copolymer composition (NACC); soaking the NACC in an organic acid to form a soaked non-acid copolymer composition (SNACC); providing a cation source in an amount sufficient to neutralize at least a portion of the organic acid; and melt processing the SNACC and cation source to form the NNIPC.

The NACC comprises at least one non-acid ethylene copolymer (NAEC) such as a maleic anhydride-grafted metallocene-catalyzed ethylene-butene copolymer; a grafted non-acid ethylene copolymer; an ethylene acetate copolymer or an ethylene-(meth)acrylate copolymer; an ethylene vinyl acetate (EVA) copolymer, an ethylene methyl acrylate (EMA) copolymer, an ethylene butyl acrylate (EBA) copolymer, an ethylene ethyl acrylate (EEA) copolymer; and blends thereof.

Herein, a copolymer results from the polymerization of two or more different monomers. Therefore, the NAEC is formed from two or more different monomers, none of which contains an acid group.

In one embodiment, the NAEC is functionalized with one of an acid anhydride group, an epoxy group, a glycidyl group, an hydroxyl group, a maleic anhydride group, an amine group, a carboxylic group, a sulfonic acid group, and a thiol group.

The glycidyl group, for example, may comprise at least one of allylglycidylether, vinylglycidylether, glycidyl maleate, itaconate glycidyl acrylate, methacrylate, 2-cyclohexene-1-glycidylether, cyclohexene-4,5 diglycidylcarboxylate, cyclohexene-4-glycidyl carboxylate, 5-norbornene-2-methyl-2-glycidyl carboxylate, and endocis-bicyclo(2,2,1)-5-heptene-2,3-diglycidyl dicarboxylate.

The NAEC may comprise at least one of a maleic anhydride-modified ethylene-propylene copolymer, a maleic anhydride-modified ethylene-propylene-diene terpolymer, a maleic anhydride-modified polyethylene, a maleic anhydride-modified polypropylene, and a maleic anhydride-modified ethylene-alkyl(meth)acrylate copolymer.

In one embodiment, the NACC comprises at least one polyethylene such as a high density polyethylene (HDPE), a low density polyethylene (LDPE), a linear low density polyethylene (LLDPE), an ultra low-density polyethylene (ULDPE). The NACC may comprise at least one of an ethylene-propylene rubber (EPR) and an ethylene propylene diene monomer rubber (EPDM).

In one embodiment, the NACC comprises at least one elastomeric polyolefin formed from ethylene and an α-olefin selected from the group consisting of: propylene, hexene, octene, 1,4-hexadiene, ethylidene norbornene.

The α-olefin may comprise, for example, at least one of ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-dococene, 1-tetracocene, 1-hexacocene, 1-octacocene, and 1-triacontene.

The NACC may also comprise at least one of a block copolymer of poly(ether-ester) copolymer, a styrene block copolymer, a maleic anhydride-grafted copolymer, a copolymer having a sulfonic graft, a copolymer having hydroxyl functionality, ethylene-methyl acrylate, ethylene-butyl acrylate, ethylene-octene copolymers made with metallocene catalysts, ethylene-alpha olefin copolymers formed from metallocene catalysts, terpolymers formed from metallocene catalysts, an ethylene-propylene-(diene monomer) terpolymer and sulfonated or carboxylated derivatives thereof, poly (trimethylene terephthalate), a block copolymer of copoly (ester-ester), a block copolymer of copoly(ester-ether), a block copolymer of copoly(urethane-ester), a block copolymer of copoly(urethane-ether), a block polystyrene thermoplastic elastomer comprising an unsaturated rubber, a block polystyrene thermoplastic elastomer comprising a functionalized substantially saturated rubber, poly(ethylene terephthalate), poly(butylene terephthalate), poly(vinyl alcohol), poly(vinyl acetate), poly(silane), poly(vinylidene fluoride), an acrylonitrile-butadiene-styrene copolymer, and trans-polyisoprene.

The styrene-block copolymer may comprise a partially or fully hydrogenated styrene-butadiene-styrene block copolymers, a styrene-(ethylene-propylene)-styrene block copolymer, a styrene-(ethylene-butylene)-styrene block copolymer, a styrene-ethylene-butadiene-styrene block copolymer, a styrene-isobutylene-styrene block copolymer, a styrene-isoprene-styrene block copolymer, a styrene-methacrylate-butadiene block copolymer, a styrene-acrylonitrile block copolymer, a styrene-acrylonitrile-butadiene block copolymer, a styrene-ethylene-propylene-acrylonitrile block copolymer, and blends thereof.

The organic acid may be selected from the group consisting of aliphatic organic acids, aromatic organic acids, saturated mono- or multi-functional organic acids, unsaturated mono- or multi-functional organic acids, and multi-unsaturated mono- or multi-functional organic acids. The organic acid may comprise stearic acid, behenic acid, erucic acid, oleic acid, linoleic acid, linolenic acid or dimerized derivatives and blends thereof.

The soaking step may be performed at a soaking temperature of from about 20° C. to about 100° C. but any temperature is contemplated at which the non-acid copolymer composition soaks up the organic acid. And some embodiments may comprise a single soaking step, whereas different embodiments require two or more soaking steps.

In one embodiment, the SNACC comprises the organic acid and NACC in a weight ratio of about 2:3. The SNACC may comprise the organic acid and NACC in a weight ratio of from about 1:9 to about 1:1. Non-limiting examples of the weight ratio of organic acid to NACC may also be as follows. In one embodiment, the weight ratio is from about 1:3 to about 3:5. In yet another embodiment, the weight ratio is from about 1:5 to about 3.25:5. More particularly, the weight ratio of organic acid to NACC may have a lower limit of about 1:9 or about 1:5 or about 1:4 or about 1:3 or about 1:2 and an upper limit of about 1:2 or about 2:3 or about 1:1 or about 3:2 or about 2:1.

Additionally, in one embodiment, the weight ratio of organic acid to NACC is about 2:3. In another embodiment, the weight ratio of organic acid to NACC is about 1:5. In yet another embodiment, the weight ratio of organic acid to NACC is about 1:1. In still another embodiment, the weight ratio of organic acid to NACC is about 1:9. In a different embodiment, the weight ratio of organic acid to NACC is about 2:9. In another embodiment, the ratio of organic acid to NACC is about 3:2.

The invention is also directed to method of making a golf ball having at least one component comprising a neutralized non-ionomeric polymer composition (NNIPC), comprising the steps of: providing a center; forming a layer about the center; and forming a cover about the layer; wherein at least one of the center, the layer and the cover comprises an NNIPC formed by: providing a non-acid copolymer composition (NACC); soaking the NACC in an organic acid to form a soaked non-acid copolymer composition (SNACC); providing a cation source in an amount sufficient to neutralize the organic acid; and melt processing the SNACC and cation source.

And the invention is further directed to a golf ball comprising: a core having one or more layers and a cover disposed about the core; wherein at least one of the core and the cover comprises a neutralized non-ionomeric polymer composition (NNIPC) formed from a soaked non-acid copolymer composition (SNACC) comprising a non-acid copolymer composition (NACC) soaked in an organic acid; and wherein at least a portion of acid groups present in the SNACC are neutralized.

Moreover, the invention is directed to a method of making a non-ionomeric, non-halogenated polymer composition (NINHPC) suitable for use in a golf ball component comprising the steps of: providing a non-acid and non-halogenated polymer composition (NANHPC); and soaking the NANHPC in an ester of an organic acid to form a soaked non-acid and non-halogenated polymer composition (SNANHPC).

Non-limiting examples of esters of organic acids such include aliphatic organic acids, aromatic organic acids, saturated mono- or multi-functional organic acids, unsaturated mono- or multi-functional organic acids, and multi-unsaturated mono- or multi-functional organic acids.

Esters of organic acids may include, for example, esters of stearic acid, behenic acid, erucic acid, oleic acid, linoleic acid, linolenic acid or dimerized derivatives and blends thereof.

The NANHPC may comprise at least one of a polyolefin and a polyethylene copolymer.

The invention also relates to a method of making a golf ball having at least one component comprising a non-ionomeric, non-halogenated polymer composition (NINHPC), comprising the steps of: providing a center; forming a layer about the center; and forming a cover about the layer; wherein at least one of the center, the layer and the cover comprises an NINHPC formed by: providing a non-acid, non-halogenated polymer composition (NANHPC); and soaking the NANHPC in an ester of an organic acid to form a soaked non-acid, non-halogenated polymer composition (SNANHPC).

Furthermore, the invention is directed to a golf ball comprising: a core having one or more layers and a cover disposed about the core; wherein at least one of the core and the cover comprises a non-ionomeric, nonhalogenated polymer composition (NINHPC) formed from a soaked non-acid, non halogenated polymer composition (SNANHPC) comprising a non-non-acid, non-halogenated polymer composition (NANHPC) soaked in an ester of an organic acid. The soaking step may be performed at any temperature at which the NANHPC soaks up the ester of an organic acid. And while some embodiments may comprise a single soaking step, other embodiments may require two or more soaking steps.

In one embodiment, the SNANHPC comprises the ester of organic acid and NANHPC in a weight ratio of about 2:3. The SNANHPC may comprise the ester of organic acid and NANHPC in a weight ratio of from about 1:9 to about 1:1. Non-limiting examples of the weight ratio of ester of organic acid to NANHPC may also be as follows. In one embodiment, the weight ratio is from about 1:3 to about 3:5. In yet another embodiment, the weight ratio is from about 1:5 to about 3.25:5. More particularly, the weight ratio of ester of organic acid to NANHPC may have a lower limit of about 1:9 or about 1:5 or about 1:4 or about 1:3 or about 1:2 and an upper limit of about 1:2 or about 2:3 or about 1:1 or about 3:2 or about 2:1.

Additionally, in one embodiment, the weight ratio of ester of organic acid to NANHPC is about 2:3. In another embodiment, the weight ratio of ester of organic acid to NANHPC is about 1:5. In yet another embodiment, the weight ratio of ester of organic acid to NANHPC is about 1:1. In still another embodiment, the weight ratio of ester of organic acid to NANHPC is about 1:9. In a different embodiment, the weight ratio of ester of organic acid to NANHPC is about 2:9. In another embodiment, the ratio of ester of organic acid to NANHPC is about 3:2.

As demonstrated in TABLE III and TABLE IV below, golf ball materials incorporating at least one of an NNIPC and an NINHPC exhibit better resiliency and durability than conventional non-ionomeric polymer compositions. And meanwhile, without the formulation error and/or non-uniform distribution that may result when adding ingredients into the mixture (e.g. extruder, injection molding unit) separately.

DETAILED DESCRIPTION OF THE INVENTION

The present invention is directed to neutralized polymer compositions (NPCs) and blends thereof for the use in golf equipment, preferably in golf ball cores (centers and core layers), intermediate layers, and/or covers. The acid moieties of the NPCs, typically acid copolymer organic acid blends, may be neutralized less than 70%, or 70-80%, or greater than 80%, 70-90% or 90-100%. The NPCs can be also be blended with a second polymer ingredient, which, if containing an acid group, may be neutralized by the cation source. The second polymer ingredient, which may be partially or fully neutralized, may comprise ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. NPCs may have a material hardness of between about 10 Shore D and about 90 Shore D, and a flexural modulus of between about 3,000 psi and about 200,000 psi.

In one embodiment of the present invention the NPCs are ionomers and/or their acid precursors that are neutralized, either fully or partially, with the cation source. The acid copolymers may be α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In one embodiment, X is acrylic or methacrylic acid and Y is a $C_{1-8}$ alkyl acrylate or methacrylate ester. X may be present in an amount from about 1 to about 35 weight percent of the polymer, or from about 5 to about 30 weight percent of the polymer, or from about 10 to about 20 weight percent of the polymer. Y may be present in an amount from about 0 to about 50 weight percent of the polymer, or from about 5 to about 25 weight percent of the polymer, or from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate, ethylene/acrylic acid/ethyl acrylate, and ethylene/methacrylic acid/ethyl acrylate, ethylene/acrylic acid, and ethylene/methacrylic acid.

Ionomers are typically neutralized with a metal cation, such as Al, Li, Na, Mg, K, Ca, or Zn. It has been found that by adding sufficient organic acid along with a cation source, the acid copolymer or ionomer can be neutralized, without losing processability, to a level much greater than with a cation source alone. The acid moieties may be neutralized less than 70%, 70-80%, or greater than 80% without losing processability. This is accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties.

The organic acids may be aliphatic, aromatic, di-acids, dimer acids, mono- or multi-functional, saturated, unsaturated, or multi-unsaturatedorganic acids. Salts of these organic acids may also be employed. The salts of organic acids may include barium, lithium, sodium, zinc, bismuth, chromium, cobalt, copper, potassium, strontium, titanium, tungsten, magnesium, cesium, iron, nickel, silver, aluminum, tin, or calcium. Salts of fatty acids such as stearic, behenic, erucic, oleic, linoleic or dimerized derivatives thereof are also suitable. The organic acids and salts of the present invention may be relatively non-migratory (they do not bloom to the surface of the polymer under ambient temperatures) and non-volatile (they do not volatilize at temperatures required for melt-blending).

In TABLE IA and TABLE IB below, seven soaked polymer compositions (SPCs) were formed and one SPC attempted as follows:

TABLE IA

| SPC Parameters | SPC1 | SPC2 | SPC3 | SPC4 | SPC5 |
|---|---|---|---|---|---|
| Escor ®AT-320* (lbs.) | 2.4 | 2.4 | 2.4 | 2.4 | 2.4 |
| Oleic acid** (lbs.) | 1.6 | — | 1.6 | 1.6 | 1.6 |
| Erucic acid*** (lbs.) | — | 1.6 | — | — | — |
| Soak I Temp. (° C.) | 40 | 50 | 40 | Rm. temp. | Rm. temp. |
| Soak I Duration (hrs.) | 96 | 36 | 48 | 24 | >1 yr |
| Soak II Temp. (° C.) | 50 | 60 | 50 | 60 | — |
| Soak II Duration (hrs.) | 24 | 24 | 96 | 24 | — |
| Soak III Temp. (° C.) | 55 | 65 | — | — | — |
| Soak III Duration (hrs.) | 24 | 24 | — | — | — |
| SPC Formed? | Yes | Yes | Yes | Yes, but minor adhesion observed | No, pellets did not absorb substantially all of the fatty acid |

*Escor ®AT-320 is a ethylene/acrylic acid/methyl acrylate terpolymer from ExxonMobil.
**The melting point of oleic acid is about 13-18° C.
***The melting point of erucic acid is about 28-34° C.

TABLE IB

| SPC Parameters | SPC6 | SPC7 | SPC8 |
|---|---|---|---|
| 5986* (lbs.) | 1.7 | — | — |
| AT320** (lbs.) | 0.7 | — | — |
| AD1043*** (lbs.) | — | 3.2 | — |
| 5980i**** (lbs.) | — | — | 1.8 |
| 4700***** (lbs.) | — | — | 0.6 |
| Oleic acid (lbs.) | 1.6 | 0.8 | 1.6 |
| Soak I Temp. (° C.) | 40 | 50 | 40 |
| Soak I Duration (hrs.) | 17.5 | 20 | 8 |
| Soak II Temp. (° C.) | 50 | — | Rm. Temp. |
| Soak II Duration (hrs.) | 11.5 | — | 16 |
| Soak III Temp. (° C.) | 45 | — | 40 |
| Soak III Duration (hrs.) | 4 | — | 10 |
| Soak IV Temp. (° C.) | 40 | — | Rm. Temp. |
| Soak IV Duration (hrs.) | 16 | — | 14 |
| Soak V Temp. (° C.) | 50 | — | 50 |
| Soak V Duration (hrs.) | 8.5 | — | 8 |
| SPC Formed? | Yes | Yes | Yes |

*Primacor ®5986 is a 20.5% acid ethylene/acrylic acid copolymer manufactured by The Dow Chemical Company.
**Escor ®AT-320 is an ethylene/acrylic acid/methyl acrylate terpolymer from ExxonMobil.
***HPC ®AD1043 is an ionomer manufactured by DuPont.
****Primacor ®5980i is a 20.5% acid ethylene/acrylic acid copolymer manufactured by The Dow Chemical Company.
*****Lotader ®4700 is an ethylene/ethyl acrylate copolymer manufactured by Arkema.

In each of the examples of TABLE IA and TABLE IB, an ethylene/acid copolymer was soaked in an organic acid. For example, soaked polymeric compositions SPC1, SPC3, SPC4 and SPC5 of TABLE IA were formed by soaking AT320 pellets in oleic acid in a weight ratio of 3:2, respectively. Each of the processes shown in TABLE 1A and TABLE 1B differ in at least one of the following respects: by the polymer; and/or the number of soaking steps performed; and/or the soaking temperature for each step; and/or the duration of each step; and/or the total process soaking time. For example, in examples SPC1, SPC2, SPC3, SPC4, and SPC5, the acid copolymer is Escor®AT-320, whereas, SPC6 incorporates a polymer blend of Escor®AT-320 and Primacor® 5986. While SPC1 and SPC3 share the same total process soaking duration of 144 hours, example SPC1 has three different soaking steps that are performed at three different soaking temperatures, whereas in example SPC3, only two different soaking steps were performed at two different soaking temperatures. In example SPC 8, the two polymers were first melt-blended prior to the soaking step.

Notably, in examples SPC4, SPC5 and SPC8, at least one soaking step was performed at room temperature (about 20-23° C.), which is very close to or is at the melting point for the chosen organic acid (18-32° C.).

The process of example SPC5, performed in a single soaking step at room temperature, failed to produce an SPC due to insufficient fatty acid absorption. In contrast, in example SPC4, some adhesion was observed, but not sufficient enough to constitute blocking. In example SCP4, a two step soaking process was performed, with one step being performed at room temperature and a second soaking step performed at a soaking temperature well above the melting temperature of oleic acid.

The SPCs of examples SPC1, SPC2, SPC3, SPC6 and SPC 7 as formulated in TABLE IA and TABLE IB were neutralized and injection molded into 1.55" spheres. The compression and CoR were then evaluated with respect to each sphere. These results are recorded in TABLE II below.

TABLE II

| Polymer Composition/ Polymer | % Neutralization, (target) | Compression, Atti | CoR@125 ft/sec |
|---|---|---|---|
| SPC1 | 125 | 67 | 0.798 |
| SPC2 | 105 | 60 | 0.803 |
| SPC3 | 92 | 62 | 0.782 |
| SPC4* | — | — | — |
| SPC5** | — | — | — |
| SPC6 | 105 | 111 | 0.857 |
| SPC7 | 63 | −17 | 0.503 |
| SPC8*** | — | — | — |

*There is no data for SPC4 because solid spheres were not made.
**There is no data for SPC5 because the material could not be extruded.
***In progress.

Herein, while each SPCs of examples SPC1, SPC2, and SPC3, SPC6 and SPC7 of TABLE IA and TABLE IB were neutralized via twin screw extrusion, any method known in the art may also be used to neutralize an SPC of the invention.

In TABLE III below, two soaked non-acid copolymer compositions (SNACC1 and SNACC2) and one soaked non-acid non halogenated polymer composition (SNANHPC) were formed in order to observe/evaluate whether any property improvement might also be achieved in a non-ionomer application wherein a non-acid acid copolymer composition is soaked in organic acid(s) and/or ester(s) thereof followed by neutralization and melt blending where appropriate:

TABLE III

| SNACC & SNANHPC PARAMETERS | EX. I SNACC1[1] | EX. II SNACC2[2] | EX. III SNANHPC | COMP. EX. I | COMP. EX. II | COMP. EX. III |
|---|---|---|---|---|---|---|
| L4700[3] (lbs.) | 2.4 | — | — | 4.0 | — | — |
| L4720[4] (lbs.) | — | 3.2 | — | — | 4.0 | — |
| Fusabond[5] 525D | — | — | 3.2 | — | — | 4.0 |
| Oleic Acid[6] (lbs.) | 1.6 | 0.8 | — | — | — | — |
| Ethyl Oleate[7] (lbs.) | — | — | 0.8 | — | — | — |

TABLE III-continued

| SNACC & SNANHPC PARAMETERS | EX. I SNACC1[1] | EX. II SNACC2[2] | EX. III SNANHPC | COMP. EX. I | COMP. EX. II | COMP. EX. III |
|---|---|---|---|---|---|---|
| Soak I Temp. (° C.) | 40 | Room Temp. | Room Temp. | — | — | — |
| Soak I Duration (Hrs.) | 18 | 7 | 1.5 | — | — | — |
| Soak II Temp. (° C.) | — | — | 50 | — | — | — |
| Soak II Duration (Hrs.) | — | — | 4.5 | — | — | — |

[1]Acid groups Mg neutralized to 105%.
[2]Acid groups Mg neutralized to 200%.
[3]Lotader® 4700, from Arkema, is a copolymer of ethylene and acrylic ester, grafted with maleic anhydride and has a melting point of 65° C.
[4]Lotader® 4720, from Arkema, is a copolymer of ethylene and ethyl acrylate, grafted with maleic anhydride and has a melting point of 65° C.
[5]Dupont Fusabond® 525D is a maleic anhydride modified metallocene catalyzed ethylene-butene copolymer and has a melting point of about 54° C.
[6]The melting point of Oleic Acid is about 13-18° C.
[7]Ethyl Oleate has a melting point of about −32° C.

EX. I and EX. II of TABLE III above both comprised a single soaking step of a non-acid copolymer composition (NACC) in an organic acid. In particular, SNACC1 was formed by soaking Lotader® 4700 pellets in oleic acid and SNACC2 was formed by soaking Lotader® 4720 pellets in oleic acid. TABLE III reveals that SNACC1 was comprised of 60% of the non-acid copolymer composition and 40% of the organic acid, and SNACC2 was comprised of 80% of the non-acid copolymer composition and 20% of the organic acid.

EX. I and EX. II differ in at least following additional respects. First, the non-acid copolymer pellets used in forming SNACC1 of EX. I include an acrylic ester copolymer that is grafted with 1.3% maleic anhydride, whereas the non-acid copolymer pellets used in EX. II to form SNACC2 incorporate an acrylic ester copolymer that is grafted with 0.3% maleic anhydride. Furthermore, in EX. I, the soaking step was performed at 40° C., whereas in EX. II, the soaking step was performed at room temperature (about 20-23° C.). Moreover, the soaking duration in EX. I was more than double that used in EX. II.

Referring to EX. III of TABLE III above, an SNANHPC was formed by performing two soaking steps of a non-acid, non-halogentated polymer composition (NANHPC) in an ester of an organic acid. Specifically, Fusabond®525D pellets were first soaked in ethyl oleate at room temperature for 1.5 hours, followed by additional soaking step of the Fusabond®525D pellets in the ethyl oleate at 50° C. for 4.5 hours.

Following the soaking step, SNACC1 and SNACC2 were then neutralized to 105% and 200%, respectively, via twin screw extrusion, thereby forming NNIPC1 and NNIPC2, respectively, evaluated in TABLE IV below. Only the organic acid of SNACC1 and SNACC2 of TABLE III were being neutralized, in contrast with the SPC's of TABLE IA and TABLE IB, wherein both the organic acid and the acid copolymer composition soaked therein have acid groups to be neutralized. In turn, NNIPC1 and NNIPC2 are non-ionomeric because the copolymers were not formed from monomers containing acid groups.

Meanwhile, the SNANHPC of the current invention was neither neutralized nor melt processed, being formed from a non-acid, non-halogenated polymer composition soaked in an ester of an organic acid, wherein no acid groups were present for neutralization. Thus, in EX. III, the resulting SNANHPC comprises the NINHPC, wherein melt processing is optional during formation of the SNANHPC.

Finally, the compositions of COMP. EX. I, COMP. EX. II and COMP. EX. III were unsoaked pellets of 100% Lotader® 4700, 100% Lotader® 4720, and 100% Fusabond®525D, respectively.

The resulting compositions NNIPC1, NNIPC2 and NINHPC, COMP. EX. I, COMP. EX. II and COMP. EX. III were each injection molded into 1.55" spheres and evaluated with respect to the following properties identified and recorded in TABLE IV below:

TABLE IV

| Property | EX. I NNIPC1 | EX. II NNIPC2 | EX. III NANHPC | COMP. EX. I | COMP. EX. II | COMP. EX. III |
|---|---|---|---|---|---|---|
| CoR @ 125 ft/s | 0.577 | 0.628 | 0.618 | 0.580 | 0.579 | 0.672 |
| Atti Compression | −75 | −47 | — | −71 | — | — |
| DCM | −89 | −55 | −114 | — | −96 | −56 |
| Sphere Shore D | 17.3 | 25.1 | 16.0 | 21.9 | 18.3 | 24.7 |
| Sphere JIS C | 32.3 | 43.1 | 25.4 | 36.0 | 31.3 | 16.0 |

Notably, comparing EX. I (60% Lotader® 4700/40% oleic acid) and COMP. EX. I (100% Lotader® 4700), the NNIPC1 sphere is softer (its hardness was lower by 4.6 Shore D and its compression was four points lower) without reducing the CoR much (0.003).

Comparing EX. II (80% Lotader® 4720/20% oleic acid) and COMP. EX. II (100% Lotader® 4720), the NNIPC2 sphere's CoR is improved by 0.049 or almost 50 points over the sphere of COMP. EX II.

Comparing EX. III (80% Fusabond® 525D/20% ethyl oleate) and COMP. EX. III (100% Fusabond® 525D), the sphere of Example III was softer, without losing more CoR than would be expected of a BR-ZDA cured core of the same compression.

Thus, the above-described improvements in non-ionomeric systems, achieved by soaking a non-acid copolymer in at least one organic acid or by soaking a non-acid non-halogenated polymer composition in at least one ester of an organic acid, are totally unexpected. One would not expect that adding a salt of an organic acid or ester of organic acid to the non-acid copolymer would improve properties since the two are generally not considered to be compatible. Further, neutralized acid groups of an organic acid cannot form an ionic array with the copolymer since the copolymer does not contain main-chain acid groups.

Several different methods can be used to measure compression, including Atti compression, Riehle compression, load/deflection measurements at a variety of fixed loads and offsets, and effective modulus. See, e.g., *Compression by Any Other Name, Science and Golf IV, Proceedings of the World Scientific Congress of Golf* (Eric Thain ed., Routledge, 2002) ("*J. Dalton*"). The term compression, as used herein, refers to Atti compression and is measured using an Atti compression test device. Atti compression units can be converted to Riehle (cores), Riehle (balls), 100 kg deflection, 130-10 kg deflection or effective modulus using the formulas set forth in *J. Dalton*.

Compression values are dependent on the diameter of the component being measured. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. In the present invention, a solid 1.55' sphere of inventive material may have a DCM compression anywhere at or below the Atti range of from −75 to about 200, depending on the desired properties of the resulting golf ball.

The Dynamic Compression Machine ("DCM") is an apparatus that applies a load to a core or ball and measures the number of inches the core or ball is deflected at measured loads. A crude load/deflection curve is generated that is fit to the Atti compression scale that results in a number being generated representing an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. DCM is often used to capture compressions that fall outside the Atti compression scale range of −75 to 200, since the DCM scale compression range is −246 to 200.

In the present invention, a solid sphere of inventive material may have a DCM compression of from about −200 or lower to about 150 or greater.

According to one aspect of the present invention, the golf ball is formulated to have a compression of between about 40 and about 120.

The distance that a golf ball would travel upon impact is a function of the coefficient of restitution (CoR) and the aerodynamic characteristics of the ball. For golf balls, CoR has been approximated as a ratio of the velocity of the golf ball after impact to the velocity of the golf ball prior to impact. The CoR varies from 0 to 1.0. A CoR value of 1.0 is equivalent to a perfectly elastic collision, that is, all the energy is transferred in the collision. A CoR value of 0.0 is equivalent to a perfectly inelastic collision—that is, all of the energy is lost in the collision.

CoR, as used herein, is determined by firing a golf ball or golf ball subassembly (e.g., a golf ball core) from an air cannon at two given velocities and calculating the CoR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds through the light screens, which again measure the time period required to transit between the light screens. This provides an outgoing transit time period inversely proportional to the ball's outgoing velocity. CoR is then calculated as the ratio of the outgoing transit time period to the incoming transit time period, $CoR=V_{out}/V_{in}=T_{in}/T_{out}$. Preferably, a golf ball according to the present invention has a CoR of at least about 0.770, more preferably, at least about 0.790.

The NPCs, NNIPC's and NINHPC's produced by their respective methods of the present invention may be relatively soft or relatively hard, depending on the desired properties of the resulting golf ball incorporating the material. For example, relatively soft NPCs produced by the method of the invention may have a material hardness of about 10 Shore D to about 80 Shore D, or about 80 Shore D or less, or have a Shore D hardness of 55 or less or a Shore D hardness within the range having a lower limit of 10 or 20 or 30 or 37 or 39 or 40 or 45 and an upper limit of 48 or 50 or 52 or 55 or 60 or 80. Meanwhile, relatively hard NPCs of the present invention have a Shore D hardness of 35 or greater, or have a Shore D hardness of 45 or greater or a Shore D hardness with the range having a lower limit of 45 or 50 or 55 or 57 or 58 or 60 or 65 or 70 or 75 and an upper limit of 80 or 85 or 90 or 95 Shore D. These hardness ranges also apply to the NNIPC's and NINHPC's of the invention.

For purposes of the present disclosure, material hardness is measured according to ASTM D2240 and involves measuring the hardness of a flat "slab" or "button" formed of the material. It should be understood that there is a fundamental difference between "material hardness" and "hardness as measured directly on a golf ball." Hardness as measured directly on a golf ball (or other spherical surface) typically results in a different hardness value from material hardness. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Unless stated otherwise, the hardness values given herein are material hardness values measured according to ASTM D2240, with all values reported following 14 days of aging at 50% relative humidity and 23° C. A calibrated, digital durometer, capable of reading to 0.1 hardness units is used for all hardness measurements and is set to record hardness reading at the maximum reading. The digital durometer must be attached to, and its foot made parallel to, the base of an automatic stand, such that the weight on the durometer and attack rate conform to ASTM D-2240.

A core in a golf ball of the invention may be a solid single core. Alternatively, the core may be a multi-layered core comprising a center and at least one outer core layer. The center of the core may be solid, liquid-filled or hollow sphere. A core may be surrounded by one or more intermediate and/or cover layers. A core may even include a solid or liquid center around which tensioned elastomeric material is wound.

In a golf ball of the invention, the core may comprise a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. A suitable antioxidant may be included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, may include a natural or synthetic rubber. One base rubber is 1,4-polybutadiene having a cis structure of at least 40%, or greater than 80%, or greater than 90%. Examples of desirable polybutadiene rubbers include BUNA®: CB 21, CB 22, CB 23, CB 24, CB 25, CB 29 MES, CB Nd 40, CB Nd 40 H, CB Nd 60, CB 55 NF, CB 60, CB 45 B, CB 55 B, CB 55 H, CB 55 L, CB 70 B, CB 1220, CB 1221, CB 1203, and CB 45, commercially available from LANXESS Corporation; UBEPOL® 360L and UBEPOL® 150L and UBEPOL-BR rubbers, commercially available from UBE Industries, Ltd. of Tokyo, Japan; KINEX® 7245, KINEX® 7265, and BUDENE® 1207 and 1208, commercially available from Goodyear of Akron, Ohio; SE BR-1220; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; PETROFLEX® BRNd-40; Ubepol® sold by Ube Industries Inc, Japan, BST sold by BST Elastomers, Thailand; IPCL sold by Indian Petrochemicals Ltd, India; and KARBOCHEM® ND40, ND45, Nitsu and ND60, commercially available from Karbochem or Karbochem Ltd of South Africa; Petroflex of Brazil; LG of Korea; and Kuhmo Petrochemical of Korea.

The base rubber may also comprise high or medium Mooney viscosity rubber, or blends thereof. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 30, or in the range from about 40 to about 80, or in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention.

If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber. When a mixture of elastomers is used, the amounts of other constituents in the core composition are typically based on 100 parts by weight of the total elastomer mixture.

Thermoplastic elastomers (TPE) may also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, with e.g. silicone.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy)valerate; di-t-butyl peroxide; or 2,5-di-(t-butylperoxy)-2,5-dimethyl hexane, lauryl peroxide, t-butyl hydroperoxide, α-αbis(t-butylperoxy) diisopropylbenzene, di(2-t-butyl-peroxyisopropyl)benzene, di-t-amyl peroxide, di-t-butyl peroxide. Commercially-available peroxide initiating agents include DICUP™ family of dicumyl peroxides (including DICUP™ R, DICUP™ 40C and DICUP™ 40KE) available from Crompton (Geo Specialty Chemicals). Similar initiating agents are available from AkroChem, Lanxess, Flexsys/Harwick and R.T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl) benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. Suitable commercially available zinc diacrylates include those from Cray Valley.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® L (a reaction product of p-cresol and dicyclopentadiene), VANOX® SKT (3,5-di-tert-butyl-4-hydroxyhydrocinnamic acid triester of 1,3,5-(2-hydroxyethyl)-s-triazine-2,4,6(1H,3H,5H)trione), VANOX® SWP (4,4'-butylidenebis(6-tert-butyl-3-methylphenol)), VANOX® 13 (Polyalkylpolyphenolphosphite) and VANOX® 1290 (2,2'-ethylidenebis-(4,6-di-tert-butylphenol)).

Thermoset rubber compositions incorporated in golf balls of the present invention may also include an optional soft and fast agent. As used herein, "soft and fast agent" means any compound or a blend thereof that that is capable of making a core 1) be softer (lower compression) at constant CoR or 2) have a higher CoR at equal compression, or any combination thereof, when compared to a core equivalently prepared without a soft and fast agent. Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent ingredient may also be a blend of an organosulfur compound and an inorganic sulfide compound. Examples include pentachlorobenzenethiol (PCTP) and salts thereof, including but not limited to Zn and ammonium.

As used herein when referring to the invention, the term "organosulfur compound(s)" refers to any compound containing carbon, hydrogen, and sulfur, where the sulfur is directly bonded to at least one carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (e.g. recycled core material typically ground to about 30 mesh particle).

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur ingredients may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

The core in a golf ball of the invention may be a single core having a diameter of about 1.0 inch to about 1.64 inches, preferably about 1.30 inches to about 1.620, and more preferably about 1.40 inches to about 1.60 inches.

Cores for the golf balls of the present invention may alternatively have an outer core layer formed about a center, referred to as a "dual core" arrangement. In a multi-layer embodiment, the center has an outer diameter of about 0.25 inches to about 1.40 inches, or about 0.8 inches to about 1.30 inches, or about 1.00 inches to about 1.20 inches. The core may have an outer diameter of about 1.40 inches to about 1.64 inches, or about 1.50 inches to about 1.60 inches, or about 1.53 inches to about 1.58 inches.

An intermediate layer may be disposed about the core, with the cover layer formed around the intermediate layer. A golf ball of the invention can have any overall diameter, but a generally preferred diameter is 1.68 inches—which meets the USGA (United States Golf Association) standard.

The cover may be formed of a single layer or multiple cover layers such as an inner cover layer and an outer cover layer. The cover may be formed from a castable polyurea or a castable polyurethane, i.e., meaning covers comprising castable polyurea (100% urea linkages/no urethane linkages); castable polyurethane (100% urethane linkages/no urea linkages); castable hybrid poly(urethane/urea) (the prepolymer is all urethane linkages and is cured with an amine); and castable hybrid poly(urea/urethane) (the prepolymer is all urea linkages and is cured with a polyol).

While the inventive golf ball may be formed from a variety of differing and conventional cover materials (both intermediate layer(s) and outer cover layer), preferred cover materials include, but are not limited to:

(1) Polyurethanes, such as those prepared from polyols or polyamines and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane-urea hybrids, blends or copolymers comprising urethane or urea segments.

Suitable polyurethane or polyurea compositions comprise a reaction product of at least one polyisocyanate and at least one curing agent. The curing agent can include, for example, one or more polyamines, one or more polyols, or a combination thereof. The polyisocyanate can be combined with one or more polyols or polyamines to form a prepolymer, which is then combined with the at least one curing agent. Suitable polyurethanes are described in U.S. Patent Application Publication No. 2005/0176523, which is incorporated by reference in its entirety.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Another cover material comprises a castable or reaction injection moldable polyurethane, polyurea, or copolymer or hybrid of polyurethane/polyurea. This cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

Any of the embodiments herein may have any known dimple number and pattern such as 252 to 456 or 330 to 392, for example. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL).

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of making a neutralized non-ionomeric polymer composition (NNIPC) suitable for use in a golf ball component comprising the steps of:
   providing a non-acid copolymer composition (NACC);
   soaking the NACC in an organic acid to form a soaked non-acid copolymer composition (SNACC);
   providing a cation source in an amount sufficient to neutralize at least a portion of the organic acid; and
   melt processing the SNACC and cation source to form the NNIPC;
   wherein the NACC comprises at least one non-acid ethylene copolymer (NAEC); and
   wherein the NAEC comprises at least one grafted copolymer.

2. The method of claim 1, wherein the organic acid is selected from the group consisting of aliphatic organic acids, aromatic organic acids, saturated mono- or multi-functional organic acids, unsaturated mono- or multi-functional organic acids, and multi-unsaturated mono- or multi-functional organic acids.

3. The method of claim 1, wherein the organic acid comprises stearic acid, behenic acid, erucic acid, oleic acid, linoleic acid, linolenic acid or dimerized derivatives and blends thereof.

4. The method of claim 1, wherein the soaking step is performed at a soaking temperature of from about 20° C. to about 100° C.

5. The method of claim 1, wherein the SNACC comprises the organic acid and NACC in a weight ratio of from about 1:9 to about 1:1.

6. The method of claim 1, wherein the SNACC comprises the organic acid and NACC in a weight ratio of about 2:3.

7. A method of making a neutralized non-ionomeric polymer composition (NNIPC) suitable for use in a golf ball component comprising the steps of:
   providing a non-acid copolymer composition (NACC);
   soaking the NACC in an organic acid to form a soaked non-acid copolymer composition (SNACC);
   providing a cation source in an amount sufficient to neutralize at least a portion of the organic acid; and
   melt processing the SNACC and cation source to form the NNIPC; and
   wherein the SNACC comprises the organic acid and NACC in a weight ratio of from about 1:9 to about 1:1.

8. The method of claim 7, wherein the SNACC comprises the organic acid and NACC in a weight ratio of about 2:3.

9. The method of claim 7, wherein the organic acid is selected from the group consisting of aliphatic organic acids, aromatic organic acids, saturated mono- or multi-functional organic acids, unsaturated mono- or multi-functional organic acids, and multi-unsaturated mono- or multi-functional organic acids.

10. The method of claim 7, wherein the organic acid comprises stearic acid, behenic acid, erucic acid, oleic acid, linoleic acid, linolenic acid or dimerized derivatives and blends thereof.

11. The method of claim 7, wherein the soaking step is performed at a soaking temperature of from about 20° C. to about 100° C.

12. A method of making a golf ball having at least one component comprising a neutralized non-ionomeric polymer composition (NNIPC), comprising the steps of:
   providing a center;
   forming a layer about the center; and
   forming a cover about the layer;
   wherein at least one of the center, the layer and the cover comprises an NNIPC formed by:
      providing a non-acid copolymer composition (NACC);
      soaking the NACC in an organic acid to form a soaked non-acid copolymer composition (SNACC);
      providing a cation source in an amount sufficient to neutralize the organic acid; and
      melt processing the SNACC and cation source.

13. The method of claim 12, wherein the NACC comprises at least one non-acid ethylene copolymer (NAEC).

14. The method of claim 12, wherein the organic acid is selected from the group consisting of aliphatic organic acids, aromatic organic acids, saturated mono- or multi-functional organic acids, unsaturated mono- or multi-functional organic acids, and multi-unsaturated mono- or multi-functional organic acids.

* * * * *